(12) United States Patent
Elgendy et al.

(10) Patent No.: US 11,107,191 B2
(45) Date of Patent: Aug. 31, 2021

(54) APPARATUS AND METHOD FOR DETAIL ENHANCEMENT IN SUPER-RESOLUTION IMAGING USING MOBILE ELECTRONIC DEVICE

(71) Applicant: Samsung Electronics Co., Ltd., Suwon-si (KR)

(72) Inventors: Omar A. Elgendy, West Lafayette, IN (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 16/278,567

(22) Filed: Feb. 18, 2019

(65) Prior Publication Data

US 2020/0265555 A1    Aug. 20, 2020

(51) Int. Cl.
| | |
|---|---|
| *G06T 3/00* | (2006.01) |
| *G06T 3/40* | (2006.01) |
| *G06T 5/50* | (2006.01) |
| *G06T 5/10* | (2006.01) |

(52) U.S. Cl.
CPC .......... *G06T 3/4076* (2013.01); *G06T 3/0093* (2013.01); *G06T 5/10* (2013.01); *G06T 5/50* (2013.01); *G06T 2207/20048* (2013.01)

(58) Field of Classification Search
CPC ....... G06T 3/4076; G06T 3/0093; G06T 5/10; G06T 5/50; G06T 2207/20048
See application file for complete search history.

(56) References Cited

U.S. PATENT DOCUMENTS

| | | |
|---|---|---|
| 7,412,107 B2 | 8/2008 | Milanfar et al. |
| 7,940,282 B2 | 5/2011 | Milanfar et al. |
| | (Continued) | |

FOREIGN PATENT DOCUMENTS

| | | |
|---|---|---|
| JP | 2013005219 A | 1/2013 |
| JP | 5948167 B2 | 7/2016 |
| | (Continued) | |

OTHER PUBLICATIONS

Chan et al., "Plug-and-Play ADMM for Image Restoration: Fixed Point Convergence and Applications," Cornell University, Nov. 2016, 14 pages.

(Continued)

*Primary Examiner* — Ping Y Hsieh

(57) ABSTRACT

A method includes obtaining multiple image frames of a scene using at least one camera of an electronic device and processing the multiple image frames to generate a higher-resolution image of the scene. Processing the multiple image frames includes generating an initial estimate of the scene based on the multiple image frames. Processing the multiple image frames also includes, in each of multiple iterations, (i) generating a current estimate of the scene based on the image frames and a prior estimate of the scene and (ii) regularizing the generated current estimate of the scene. The regularized current estimate of the scene from one iteration represents the prior estimate of the scene in a subsequent iteration. The iterations continue until the estimates of the scene converge on the higher-resolution image of the scene.

20 Claims, 9 Drawing Sheets

(56) References Cited

U.S. PATENT DOCUMENTS

| | | | |
|---|---|---|---|
| 8,144,253 B2* | 3/2012 | Su | G06T 5/004 |
| | | | 348/607 |
| 8,199,216 B2 | 6/2012 | Hwang | |
| 8,958,484 B2 | 2/2015 | Sbaiz | |
| 9,076,234 B2 | 7/2015 | Zheng et al. | |
| 9,123,138 B2 | 9/2015 | Lin et al. | |
| 9,438,809 B2 | 9/2016 | Sheikh et al. | |
| 9,654,700 B2 | 5/2017 | Kovtun et al. | |
| 9,832,388 B2 | 11/2017 | Motta et al. | |
| 10,097,765 B2 | 10/2018 | Sheikh et al. | |
| 2012/0128244 A1 | 5/2012 | Singh et al. | |
| 2014/0169691 A1* | 6/2014 | Lee | G06T 5/002 |
| | | | 382/233 |
| 2015/0104074 A1* | 4/2015 | Vondran, Jr. | G06T 5/50 |
| | | | 382/106 |
| 2015/0131893 A1 | 5/2015 | Sivaraman | |
| 2015/0131898 A1* | 5/2015 | Schelten | G06T 5/003 |
| | | | 382/159 |
| 2017/0180639 A1* | 6/2017 | Kamilov | G06K 9/6215 |
| 2017/0323433 A1* | 11/2017 | Ukil | G06T 7/254 |
| 2019/0147589 A1* | 5/2019 | Zhou | G06K 9/6292 |
| | | | 382/131 |

FOREIGN PATENT DOCUMENTS

| | | |
|---|---|---|
| KR | 100818479 B1 | 4/2008 |
| KR | 101621614 B1 | 5/2016 |

OTHER PUBLICATIONS

Romano et al., "The Little Engine that Could—Regularization by Denoising (RED)," Cornell University, Sep. 2017, 52 pages.

Venkatakrishnan et al., "Plug-and-Play Priors for Model Based Reconstruction," IEEE Global SIP 2013, 2013, 4 pages.

Buzzard et al., "Plug-and-Play Unplugged: Optimization-Free Reconstruction Using Consensus Equilibrium," SIAM J. Imaging Sciences, vol. 11, No. 3, 2018, pp. 2001-2020.

Zhen et al, "System and Method for Compositing High Dynamic Range Images", U.S. Appl. No. 16/277,630, filed Feb. 15, 2019, 52 pages.

* cited by examiner

APPARATUS AND METHOD FOR DETAIL ENHANCEMENT IN SUPER-RESOLUTION IMAGING USING MOBILE ELECTRONIC DEVICE

TECHNICAL FIELD

This disclosure relates generally to image capturing systems. More specifically, this disclosure relates to an apparatus and method for detail enhancement in super-resolution imaging using a mobile electronic device.

BACKGROUND

Many mobile electronic devices, such as smartphones and tablet computers, include cameras that can be used to capture still and video images. While convenient, cameras on mobile electronic devices generally cannot come close to matching the performance of digital single-lens reflex (SLR) cameras. For example, digital SLR cameras can typically be used with different "zoom" lenses that provide varying amounts of optical zoom through the physical movement of lens elements in the zoom lenses. In contrast, mobile electronic devices often provide a small amount of optical zoom and then provide for some additional amount of digital zoom. Digital zoom typically involves computationally cropping and enlarging a captured image in order to mimic the appearance of optical zoom. Unfortunately, image details tend to be lost as the amount of digital zoom increases.

SUMMARY

This disclosure provides an apparatus and method for detail enhancement in super-resolution imaging using a mobile electronic device.

In a first embodiment, a method includes obtaining multiple image frames of a scene using at least one camera of an electronic device and processing the multiple image frames to generate a higher-resolution image of the scene. Processing the multiple image frames includes generating an initial estimate of the scene based on the multiple image frames. Processing the multiple image frames also includes, in each of multiple iterations, (i) generating a current estimate of the scene based on the image frames and a prior estimate of the scene and (ii) regularizing the generated current estimate of the scene. The regularized current estimate of the scene from one iteration represents the prior estimate of the scene in a subsequent iteration. The iterations continue until the estimates of the scene converge on the higher-resolution image of the scene.

In a second embodiment, an electronic device includes at least one camera and at least one processing device configured to obtain multiple image frames of a scene and process the multiple image frames to generate a higher-resolution image of the scene. To process the multiple image frames, the at least one processing device is configured to generate an initial estimate of the scene based on the multiple image frames. To process the multiple image frames, the at least one processing device is also configured, in each of multiple iterations, to (i) generate a current estimate of the scene based on the image frames and a prior estimate of the scene and (ii) regularize the generated current estimate of the scene. The regularized current estimate of the scene from one iteration represents the prior estimate of the scene in a subsequent iteration. To process the multiple image frames, the at least one processing device is further configured to continue the iterations until the estimates of the scene converge on the higher-resolution image of the scene.

In a third embodiment, a non-transitory machine-readable medium contains instructions that when executed cause at least one processor of an electronic device to obtain multiple image frames of a scene using at least one camera of the electronic device and process the multiple image frames to generate a higher-resolution image of the scene. The instructions that when executed cause the at least one processor to process the multiple image frames include instructions that when executed cause the at least one processor to generate an initial estimate of the scene based on the multiple image frames. The instructions that when executed cause the at least one processor to process the multiple image frames also include instructions that when executed cause the at least one processor, in each of multiple iterations, to (i) generate a current estimate of the scene based on the image frames and a prior estimate of the scene and (ii) regularize the generated current estimate of the scene. The regularized current estimate of the scene from one iteration represents the prior estimate of the scene in a subsequent iteration. The instructions that when executed cause the at least one processor to process the multiple image frames further include instructions that when executed cause the at least one processor to continue the iterations until the estimates of the scene converge on the higher-resolution image of the scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 14, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, cameras in many mobile electronic devices suffer from a number of shortcomings compared to digital single-lens reflex (SLR) cameras. For example, digital SLR cameras can be used with zoom lenses that provide varying amounts of optical zoom. The optical zoom is provided by mechanically altering the distance between lens elements in a zoom lens, which allows a user to zoom in or zoom out when capturing images of a scene. In contrast, mobile electronic devices are often limited in the amount of optical zoom that can be provided, primarily due to the limited sizes of the lens elements and a lack of space in which the lens elements can be moved. As a result, mobile electronic devices often provide a small amount of optical zoom and then provide for an additional amount of digital zoom, but image details tend to be lost as the amount of digital zoom increases.

This disclosure provides techniques for multi-frame super-resolution in which multiple lower-resolution image frames of a scene are captured and used to produce a higher-resolution image of the scene. These techniques use a model-based approach for super-resolution, where a latent high-resolution image of a scene (meaning a perfect capture of the scene) is assumed to undergo a forward degradation model that results in the lower-resolution image frames actually being captured. An optimization framework is used to estimate the forward degradation model and perform image processing in an attempt to reverse the degradation based on the estimated degradation model in order to derive an improved-resolution estimate of the scene. The improved-resolution estimate of the scene is then regularized, and the result is fed back into the optimization framework. This can be repeated one or more times until a suitable final higher-resolution estimate of the scene is derived, such as by repeating these operations until the estimates of the scene converge on a final higher-resolution estimate of the scene. The final higher-resolution estimate of the scene can then be output as the final higher-resolution image of the scene. These techniques help to preserve more image details when digital zoom is being used in an electronic device. As a result, these techniques allow the digital zoom in the electronic device to more accurately mimic the behavior of an optical zoom in a digital SLR camera, at least to some extent.

Figure 1:
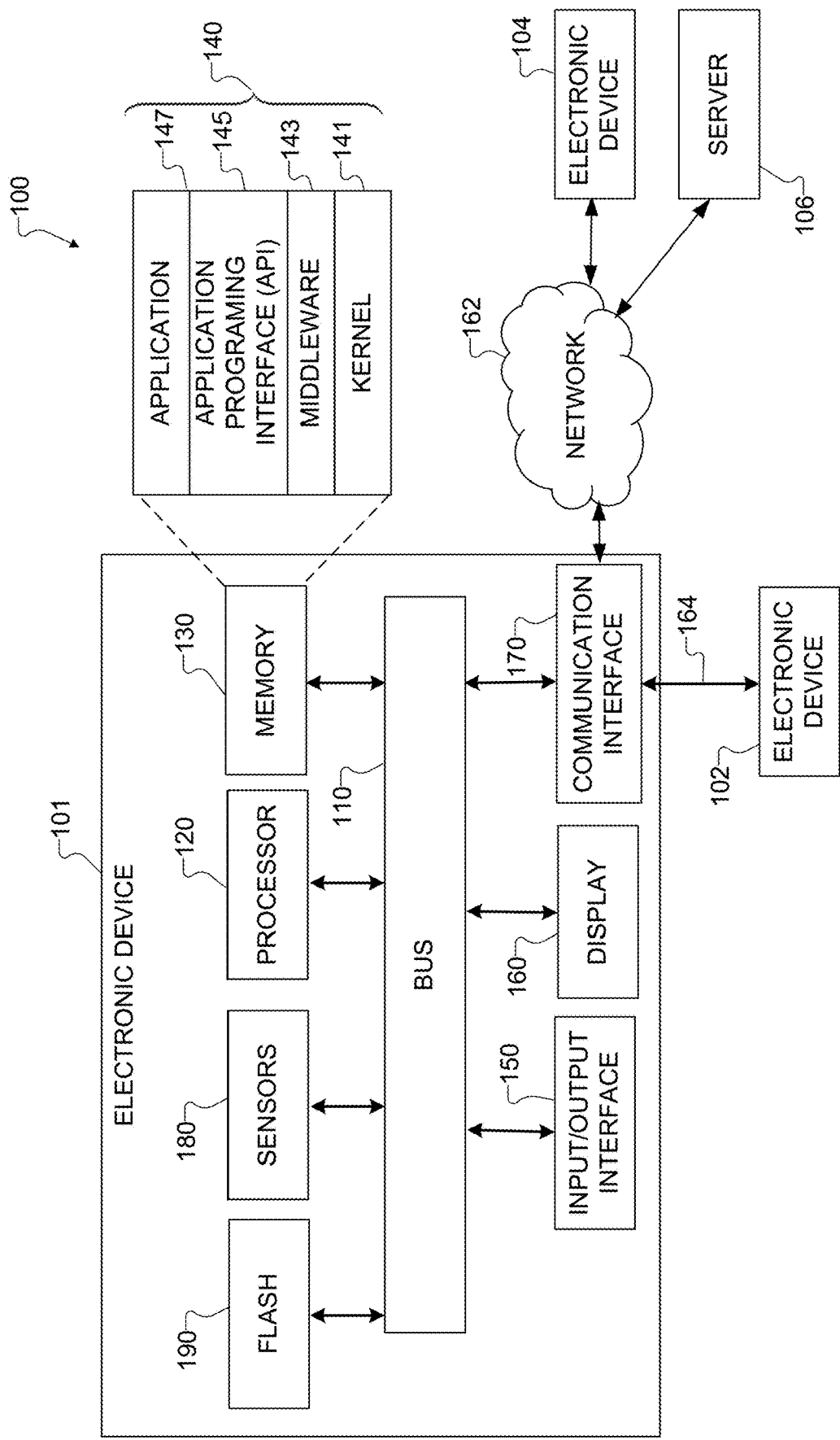
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. Among other things, the processor 120 can process the image data (as discussed in more detail below) to perform image rendering using multi-frame super-resolution to improve the image details contained in a final image of a scene.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture and image rendering as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electro-myography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101. The one or more cameras can optionally be used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
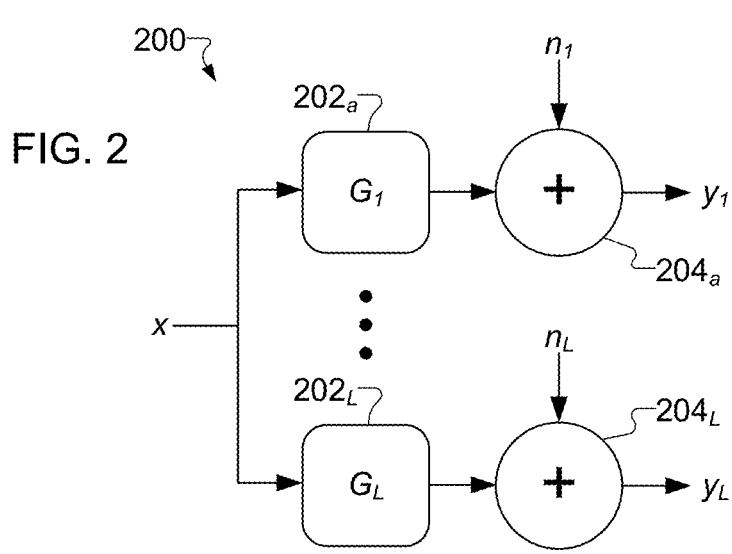
FIGS. 2, 3, and 4 illustrate example models representing the capture of multiple images of a scene in a mobile electronic device in accordance with this disclosure.
Figure 3:
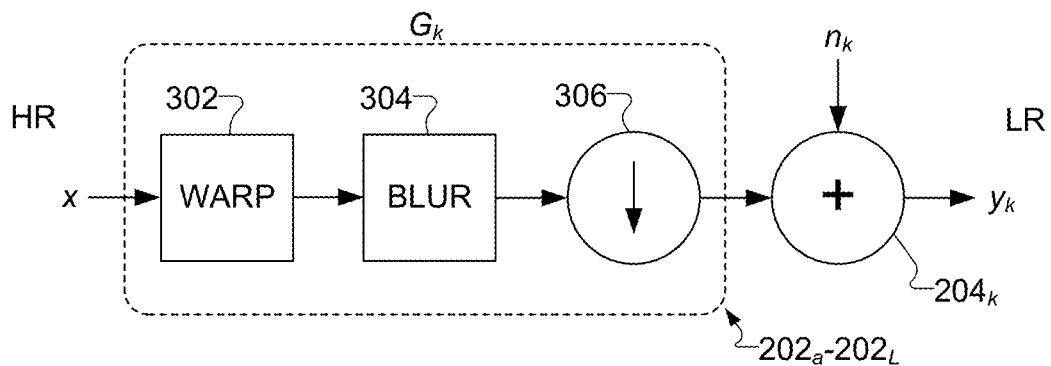
Figure 4:
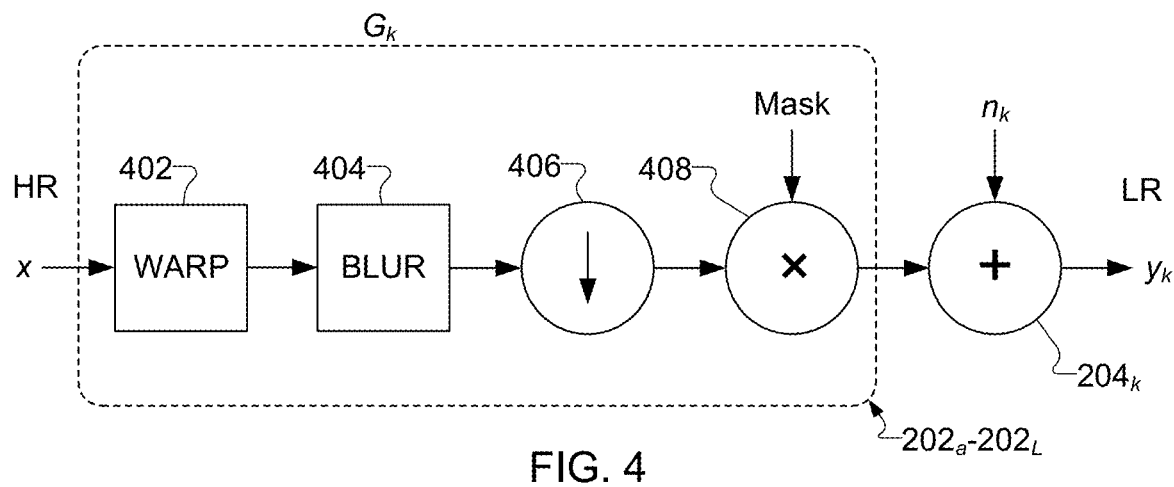

FIGS. 2, 3, and 4 illustrate example models representing the capture of multiple images of a scene in a mobile electronic device in accordance with this disclosure. In particular, FIG. 2 illustrates an example model 200 representing the capture of multiple images of a scene, and FIGS. 3 and 4 illustrate example forward degradation models within the model 200 of FIG. 2. For ease of explanation, the models shown in FIGS. 2, 3, and 4 are described as involving the use of the electronic device 101 of FIG. 1. However, the models shown in FIGS. 2, 3, and 4 could be used with any other suitable electronic device and in any suitable system.

As shown in FIG. 2, a scene being imaged by the electronic device 101 is denoted x, and multiple image frames of the scene x captured or generated by the electronic device 101 are denoted $y_1$-$y_L$. In an ideal world, the image frames $y_1$-$y_L$ would be identical to one another and would exactly match the original scene x. However, in the real world, the image frames $y_I$-$y_L$ differ from one another and are lower-resolution versions of the original scene x. In this example, forward degradation models $202_a$-$202_L$ are mathematical models representing the degradation of the original scene x as defined by respective transfer functions $G_1$-$G_L$. Also, addition operators $204_a$-$204_L$ represent the injection of random noise $n_1$-$n_L$ during the operation of the electronic device 101. Even with image frames captured or generated rapidly, the transfer functions $G_1$-$G_L$ of the forward degradation models $202_a$-$202_L$ and the noise $n_1$-$n_L$ typically vary between image frames. As a result, each image frame $y_I$-$y_L$ represents a different degraded version of the scene x.

The transfer functions $G_1$-$G_L$ of the forward degradation models $202_a$-$202_L$ can differ based on a number of factors, such as the design of the equipment being used to capture or generate the image frames $y_I$-$y_L$ and the type of image frames being analyzed. For example, FIG. 3 illustrates an example definition of the forward degradation models $202_a$-$202_L$ when grayscale image data is being processed by the electronic device 101. Note that the grayscale image frames could represent actual grayscale image frames or part of the image data associated with color image frames. As described below, for instance, only the luminance (Y) data associated with YUV image frames may be processed as grayscale image frames. As shown in FIG. 3, each forward degradation model $202_a$-$202_L$ includes a warping operator 302 to represent motion, such as motion of one or more people or objects in the scene or motion or rotation of the electronic device 101. Each forward degradation model $202_a$-$202_L$ also includes a blurring operator 304 and a downscaling operator 306 to represent the loss of resolution by the electronic device 101, such as due to the optics, image sensor, or other components of the electronic device 101. The three operators 302, 304, and 306 collectively form the transfer function $G_k$ of the $k^{th}$ forward degradation model $202_k$. The output from the transfer function is modified by the addition operator $204_k$ to inject noise $n_k$ into the image frame $y_k$ of the scene x.

FIG. 4 illustrates an example definition of the forward degradation models $202_a$-$202_L$ when color image data is being processed by the electronic device 101. As described below, for example, raw image frames captured by the image sensor(s) of the electronic device 101 may be processed. As shown in FIG. 4, each forward degradation model $202_a$-$202_L$ includes a warping operator 402, a blurring operator 404, and a downscaling operator 406, which could be the same as or similar to the corresponding components 302, 304, and 306 described above. Each forward degradation model $202_a$-$202_L$ also includes a multiplication operator 408, which multiplies the image data by a mask to recover luminance data and chrominance (U and V) data or other image data from the image sensor(s). For instance, when Bayer frames are generated by the image sensor(s), the mask could represent a color filter array (CFA) mask in which green is used to generate luminance data and red and blue are used to generate chrominance data. The four operators 402, 404, 406, and 408 collectively form the transfer function $G_k$ of the $k^{th}$ forward degradation model $202_k$. The output from the transfer function is modified by the addition operator $204_k$ to inject noise $n_k$ into the image frame $y_k$ of the scene x.

Multi-frame super-resolution imaging generally refers to the process of taking multiple image frames $y_I$-$y_L$ of a scene x and processing the image frames to generate an improved higher-resolution image of the scene x. Given the models shown in FIGS. 2 through 4, multi-frame super-resolution imaging can generally occur as follows. The processor 120 of the electronic device 101 (or some other device) attempts to estimate the forward degradation models $202_a$-$202_L$ so that inverse degradation models can be applied to the image frames $y_I$-$y_L$ during inversion operations. Ideally, the inverse degradation models would allow a significant portion or substantially all information about the scene x to be recaptured except for the presence of noise $n_1$-$n_L$, and the fact that there are multiple images of the same scene x would allow all of the (random) noise to be removed by comparing the recaptured image frames. In reality, the inverse degradation models allow more (but not all) information about the scene x to be recaptured. Also, since multiple image frames are captured and can be combined or otherwise used, it is possible to remove at least some of the noise, especially when the noise $n_1$-$n_L$ is random and therefore would affect different pixels of the image frames $y_I$-$y_L$. The following describes how an optimization framework can be used to perform inversion operations to estimate inverse degradation models and generate higher-resolution images of a scene to support multi-frame super-resolution.

Although FIGS. 2, 3, and 4 illustrate examples of models representing the capture of multiple images of a scene in a mobile electronic device, various changes may be made to FIGS. 2, 3, and 4. For example, other (and possibly more complex) models could be used here to represent the transformation of a scene x into multiple image frames $y_I$-$y_L$.

Figure 5:
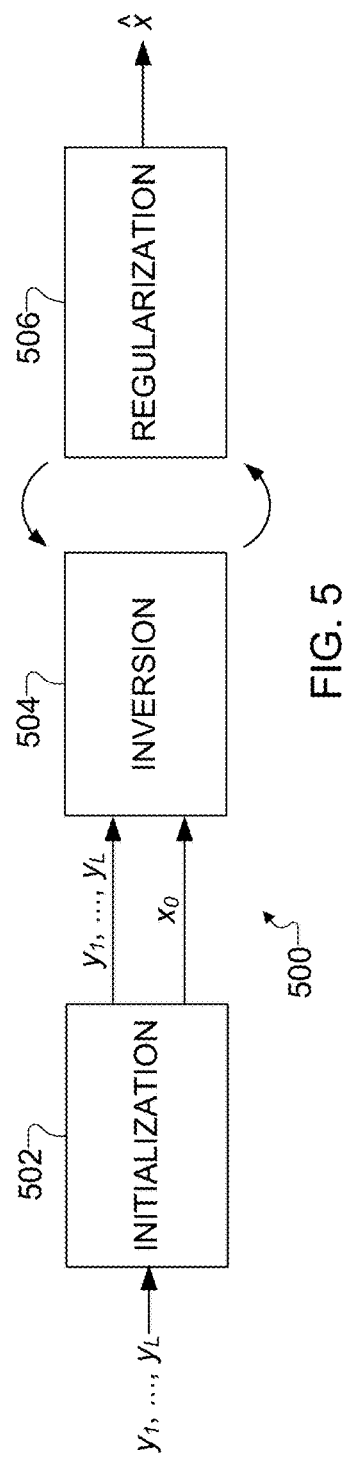
FIG. 5 illustrates an example process for multi-frame super-resolution in a mobile electronic device in accordance with this disclosure.

FIG. 5 illustrates an example process 500 for multi-frame super-resolution in a mobile electronic device in accordance with this disclosure. For ease of explanation, the process 500 shown in FIG. 5 is described as being performed using the electronic device 101 of FIG. 1. However, the process 500 shown in FIG. 5 could be used with any other suitable electronic device and in any suitable system.

As shown in FIG. 5, the process 500 implements an optimization framework that generally includes an initialization operation 502 followed by two iterative operations, namely an inversion operation 504 and a regularization operation 506. The inversion operation 504 of the optimization framework is used to estimate an inversion of the forward degradation model $202_a$-$202_L$ for each of the image frames $y_I$-$y_L$, which can then be used to partially reverse the degradation and thereby generate an improved estimate of the scene x. Because the inversion operation 504 may represent an inherently unstable operation, the regularization operation 506 of the optimization framework is used to de-noise the improved estimate of the scene x and to feed back the regularized estimate of the scene x to the inversion operation 504. This iterative process can continue until a suitable final estimate of the scene x (denoted $\hat{x}$) is generated, where the final estimate represents the final higher-resolution image of the scene x. The initialization operation 502 of the optimization framework is used to generate an initial estimate $x_0$ of the scene, which is provided to the inversion operation 504 for the first iteration of the inversion operation 504.

In some embodiments, the optimization framework here uses a maximum a posteriori (MAP) criterion that involves two terms to generate an improved estimate of a scene. One term is used for enforcing data-fidelity to the original lower-resolution input image frames $y_I$-$y_L$, and a regularization term is used to solve this ill-posed problem. Thus, the inversion operation 504 enforces data-fidelity to the image frames $y_I$-$y_L$, and the regularization operation 506 provides de-noising to support regularization of the problem being solved by the inversion operation 504. This design approach provides flexibility since, in some embodiments, the inversion operation 504 can represent a deconvolution or sharpening step and the regularization operation 506 can represent a Gaussian de-noising step. As a result, different implementations can easily be designed for these two operations 504 and 506.

As described below, the input image frames $y_1$-$y_L$ could be generated by an image signal processor of the electronic device 101, in which case the input image frames $y_1$-$y_L$ can already be processed (such as into YUV image frames). The input image frames $y_1$-$y_L$ could also be generated by one or more image sensors of the electronic device 101, in which case the input image frames $y_1$-$y_L$ can represent raw image frames (such as Bayer frames). The use of raw image frames that bypass an image signal processor may allow more detail to be recovered as described below, although the approaches described in this patent document can still be used to recover image details in processed YUV frames or other processed image frames.

To provide more specific details about the operations in the process 500, the process 500 begins when the initialization operation 502 receives a set of image frames $y_1$-$y_L$, such as in response to a burst capture or generation of the image frames by the electronic device 101. The initialization operation 502 constructs an initial estimate $x_0$ of the scene x using the image frames $y_1$-$y_L$, and the construction can vary based on the type of image data being processed (such as grayscale or color image data). The image frames $y_1$-$y_L$ and the initial estimate $x_0$ of the scene are provided to the inversion operation 504, which processes the data and generates a new improved estimate of the scene. The new estimate of the scene is forced by the inversion operation 504 to be close to the original image frames $y_1$-$y_L$ and the previous estimate, such as through the use of quadratic penalty terms. The new estimate of the scene is output to the regularization operation 506. The regularization operation 506 applies a de-noising process to the new estimate of the scene and provides the processed new estimate of the scene back to the inversion operation 504 in place of the prior estimate $x_0$. The process 500 iterates the operations 504 and 506 until some convergence criterion is met, such as until successive iterations produce a sufficiently small change between the estimates. At that point, the regularization operation 506 outputs the final estimate $\hat{x}$ of the scene. The overall goal here is to estimate the original scene x given the image frames $y_1$-$y_L$ as closely as possible, thereby providing improved detail in the final estimate $\hat{x}$ compared to the details contained in the original image frames $y_1$-$y_L$.

There are various algorithms that could be used here in the inversion operation 504 and that are known to converge to a solution. For example, one algorithm known as "Plug-and-Play" are described in Chan et al., "Plug-and-Play ADMM for Image Restoration: Fixed-Point Convergence and Applications," IEEE Transactions on Computational Imaging, volume 3, issue 1, 2017, pp. 84-98 and Venkatakrishnan et al., "Plug-and-Play Priors for Model Based Reconstruction," IEEE Global Conference on Signal and Information Processing, 2013, pp. 945-948 (which are hereby incorporated by reference in their entirety). Another algorithm known as Regularization by Denoising (RED) is described in Romano et al., "The Little Engine That Could: Regularization by Denoising (RED)," SIAM Journal on Imaging Sciences, volume 10, issue 4, 2017, pp. 1804-1844 (which is hereby incorporated by reference in its entirety). A third algorithm known as Consensus Equilibrium is described in Buzzard et al., "Plug-and-Play Unplugged: Optimization Free Reconstruction Using Consensus Equilibrium," SIAM Journal on Imaging Sciences, volume 11, issue 3, 2018, pp. 2001-2020 (which is hereby incorporated by reference in its entirety). In some cases, Consensus Equilibrium could have the fastest convergence properties, although any of these algorithms or any other suitable algorithms could be used here.

In some embodiments, the inversion operation 504 involves solving a linear system of equations, which can be similar to a deconvolution or sharpening process. For grayscale multi-frame super-resolution, the inversion operation 504 could be performed by transforming an image into the frequency domain (such as by using a Fast Fourier Transform or "FFT"), dividing the frequency domain data by the frequency response of a deconvolution filter, and transforming the division result back into the spatial domain (such as by using an inverse FFT or "IFFT"). The inversion operation 504 could also be performed by approximating an infinite impulse response (IIR) deconvolution filter using a finite impulse response (FIR) filter and applying the filter for inversion. The second approach may be more computationally efficient than the first approach, but either approach or other approaches could be used here. For color multi-frame super-resolution, the inversion operation 504 could be performed by solving the deconvolution (inversion) problem, which is a linear system of equations, using a projected conjugate gradient technique, a conjugate gradient steepest descent technique, or other technique.

Example implementations of the initialization operation 502 and the inversion operation 504 are described below. The regularization operation 506 can be implemented in any suitable manner that provides some form of regularization to the iterative process shown in FIG. 5. In mathematical terms, regularization refers to the act of introducing information in order to solve an ill-posed problem, such as by performing a Gaussian de-noising of the current estimate of a scene that is output by the inversion operation 504. In some embodiments, different Gaussian de-noisers can correspond to different regularization functions that could be used in the optimization framework. In particular embodiments, the regularization operation 506 can be implemented using a total variation de-noiser with a mixture of L1 and L2 gradient penalty terms. In other particular embodiments, a deep de-noiser can be used to generate data-driven image priors, or a currently-deployed de-noiser used in a conventional camera system pipeline in a mobile electronic device could be used. Other de-noising techniques can also be used here. One advantage of this approach is its modularity and flexibility, where any convenient inversion and de-noising techniques can be used.

Although FIG. 5 illustrates one example of a process 500 for multi-frame super-resolution in a mobile electronic device, various changes may be made to FIG. 5. For example, any suitable operations could occur during the initialization, inversion, and regularization operations. While example implementations of these operations are described below, other suitable implementations could be used.

Figure 6:
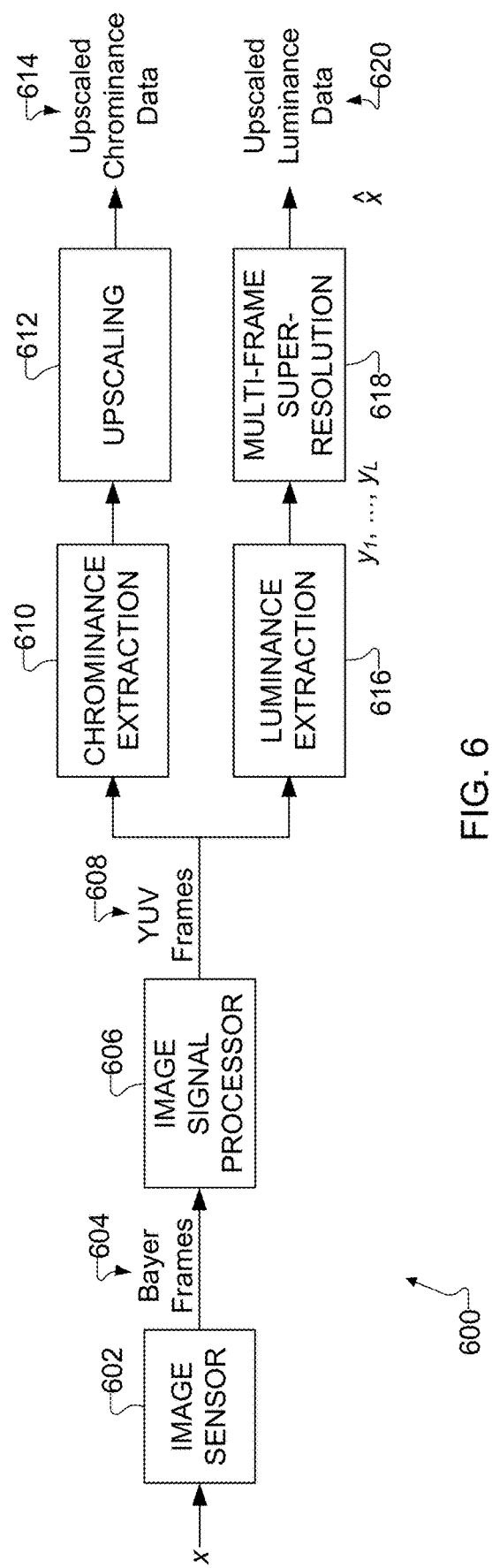
FIG. 6 illustrates a first example process for image capture and image rendering using multi-frame super-resolution in a mobile electronic device in accordance with this disclosure.

FIG. 6 illustrates a first example process 600 for image capture and image rendering using multi-frame super-resolution in a mobile electronic device in accordance with this disclosure. For ease of explanation, the process 600 shown in FIG. 6 is described as being performed using the electronic device 101 of FIG. 1. However, the process 600 shown in FIG. 6 could be used with any other suitable electronic device and in any suitable system.

As shown in FIG. 6, the process 600 involves the use of at least one image sensor 602, which could represent one or more sensors 180 in at least one camera of the electronic device 101. The image sensor 602 can be used to generate raw image frames 604 associated with a scene. In this example, the image sensor 602 produces raw image frames 604 in the form of Bayer images. However, other image sensors 602 could produce raw image frames 604 in other forms. Any suitable image sensor(s) 602 could be used here, such as at least one stacked image sensor like the three-stack ISOCELL Fast 2L3 image sensor. An image signal processor 606 processes the raw image frames 604 to produce processed image frames 608. For example, the image signal processor 606 could perform image processing operations such as demosaicing, noise reduction, auto-exposure adjustment, auto-focus adjustment, and auto-white balance adjustment. In this example, the image signal processor 606 produces processed image frames 608 in the form of YUV frames that contain luminance and chrominance data. However, other image signal processors 606 could produce processed image frames 608 in other forms.

In this example, a chrominance extraction operation 610 receives and processes the image frames 608 to obtain the chrominance data from the processed image frames 608. This could include, for example, the chrominance extraction operation 610 retrieving the U and V chrominance data from the YUV image frames. An upscaling operation 612 receives the chrominance data and upscales the chrominance data to produce upscaled chrominance data 614. Any suitable amount of upscaling can be used, such as by upscaling the chrominance data by a factor of two. Any suitable upscaling technique can be used here, such as bilinear upscaling.

Also, in this example, a luminance extraction operation 616 receives and processes the image frames 608 to obtain luminance data from the processed image frames 608. This could include, for example, the luminance extraction operation 616 retrieving the Y luminance data from the YUV image frames. The output of the luminance extraction operation 616 represents grayscale image frames $y_1$-$y_L$. The grayscale image frames $y_1$-$y_L$ are provided to a multi-frame super-resolution operation 618, which implements the optimization framework including the initialization operation 502, inversion operation 504, and regularization operation 506 in FIG. 5. The output of the multi-frame super-resolution operation 618 is upscaled luminance data 620. The combination of the upscaled chrominance data 614 and the upscaled luminance data 620 represents a higher-resolution recreation of the scene (the final estimate $\hat{x}$), which has a higher resolution than the processed image frames 608.

Figure 7:
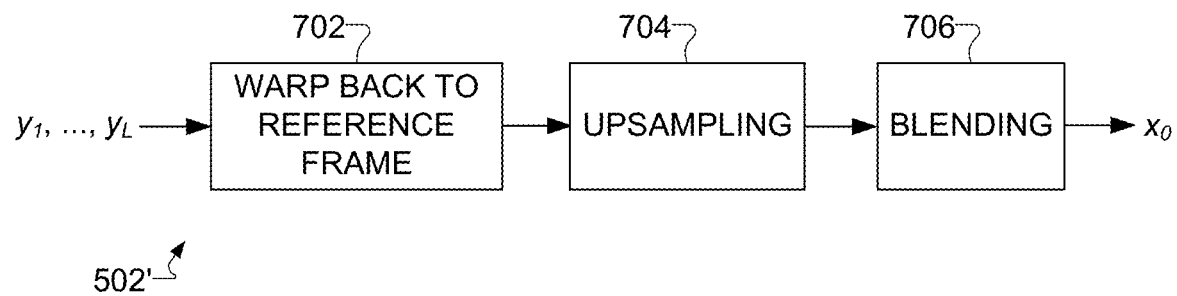
FIG. 7 illustrates an example initialization operation in the process of FIG. 6 in accordance with this disclosure.

FIG. 7 illustrates an example initialization operation 502' in the process 600 of FIG. 6 in accordance with this disclosure. In particular, the initialization operation 502' occurs as part of the multi-frame super-resolution operation 618. As shown in FIG. 7, the initialization operation 502' includes a warping function 702, which generally operates to align the input image frames $y_1$-$y_L$. This is typically done by selecting one of the input image frames $y_1$-$y_L$ as a reference image frame and then aligning the other non-reference image frames to the reference image frame. The warping function 702 can use any suitable technique to align image frames, and various alignment techniques are known in the art. An upsampling operation 704 receives the aligned image frames and upsamples the image data to produce upsampled image frames. Any suitable amount of upsampling can be used, such as by upsampling the image data by a factor of two. Also, any suitable upsampling technique can be used here, such as bicubic upsampling. A blending operation 706 receives the upsampled image frames and blends the image frames to produce the initial estimate $x_0$ of the scene. Any suitable blending technique can be used here, such as by averaging the pixel values in the upsampled aligned image frames. Note, however, that other techniques could be used to produce the initial estimate $x_0$ of the scene based on the image frames $y_1$-$y_L$.

Figure 8:
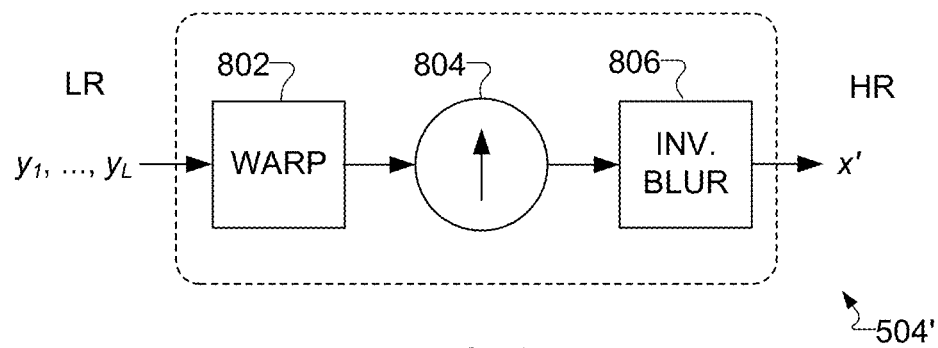
FIG. 8 illustrates an example inversion operation in the process of FIG. 6 in accordance with this disclosure.

FIG. 8 illustrates an example inversion operation 504' in the process 600 of FIG. 6 in accordance with this disclosure. In particular, the inversion operation 504' occurs as part of the multi-frame super-resolution operation 618. In general, the inversion operation 504' shown in FIG. 8 implements an inversion of the forward degradation models $202_a$-$202_L$ shown in FIG. 3 for grayscale image data. To implement the inversion of the forward degradation models $202_a$-$202_L$, the inversion operation 504' includes warping operations 802, upscaling operations 804, and an inverse blurring operation 806. The warping operations 802 generally operate to reverse the motion affecting the scene, such as motion with the scene or motion or rotation of the electronic device 101. The upscaling operations 804 and the inverse blurring operation 806 generally operate to reverse the loss of resolution by the electronic device 101, such as by reversing the loss of resolution due to the optics, image sensor 602, or other components of the electronic device 101.

In this implementation, the operations 802, 804, and 806 represent a direct inversion model that converts the input image frames $y_1$-$y_L$ into a higher-resolution image x' of the scene x. In some embodiments, the direct inversion model can be implemented as a single FIR filter that approximates the true inverse of the forward degradation models $202_a$-$202_L$. As described above, in some embodiments, the FIR filter represents an approximation of an IIR deconvolution filter that ideally represents the forward degradation models $202_a$-$202_L$. One function of the multi-frame super-resolution operation 618 is to find the best approximate FIR filter representing the inversion model, where the approximate FIR filter is improved in each iteration of the process 500.

As noted above, an alternative technique for performing the inversion operation 504' involves transforming the image frames $y_1$-$y_L$ into the frequency domain, such as by using a Fast Fourier Transform. The resulting frequency domain data is divided by the frequency response of the FIR filter. The resulting quotient values are converted back into the spatial domain, such as by using an inverse FFT. Again, one function of the multi-frame super-resolution operation 618 is to find the best approximate FIR filter representing the inversion model, where the approximate FIR filter is improved in each iteration of the process 500.

This inversion operation 504' can be performed for the image frames $y_1$-$y_L$ during each iteration of the process 500 in the multi-frame super-resolution operation 618. Ideally, this allows the process 500 to be used to recover an increased amount of image data from the original image frames $y_1$-$y_L$. The resulting improved image frames eventually converge during the iterations of the process 500 to be similar enough to be generally considered equivalent. For example, the differences between the resulting improved image frames can eventually drop below some threshold value. The exact amount of similarity between the resulting improved image frames can be based on any suitable criteria, such as a threshold percentage or amount. Also, the amount of similarity can vary based on the computational power available, which can limit the number of iterations or the time for performing the iterations (and thus limit the amount of convergence that can be obtained).

Although FIG. 6 illustrates a first example of a process 600 for image capture and image rendering using multi-frame super-resolution in a mobile electronic device and FIGS. 7 and 8 illustrate examples of operations in the process 600 of FIG. 6, various changes may be made to FIGS. 6, 7, and 8. For example, various operations shown in FIGS. 6, 7, and 8 could overlap, occur in parallel, occur in a different order, or occur any number of times. Also, the specific operations shown in FIGS. 7 and 8 are examples only, and other techniques could be used to perform each of the operations shown in FIGS. 7 and 8.

Figure 9:
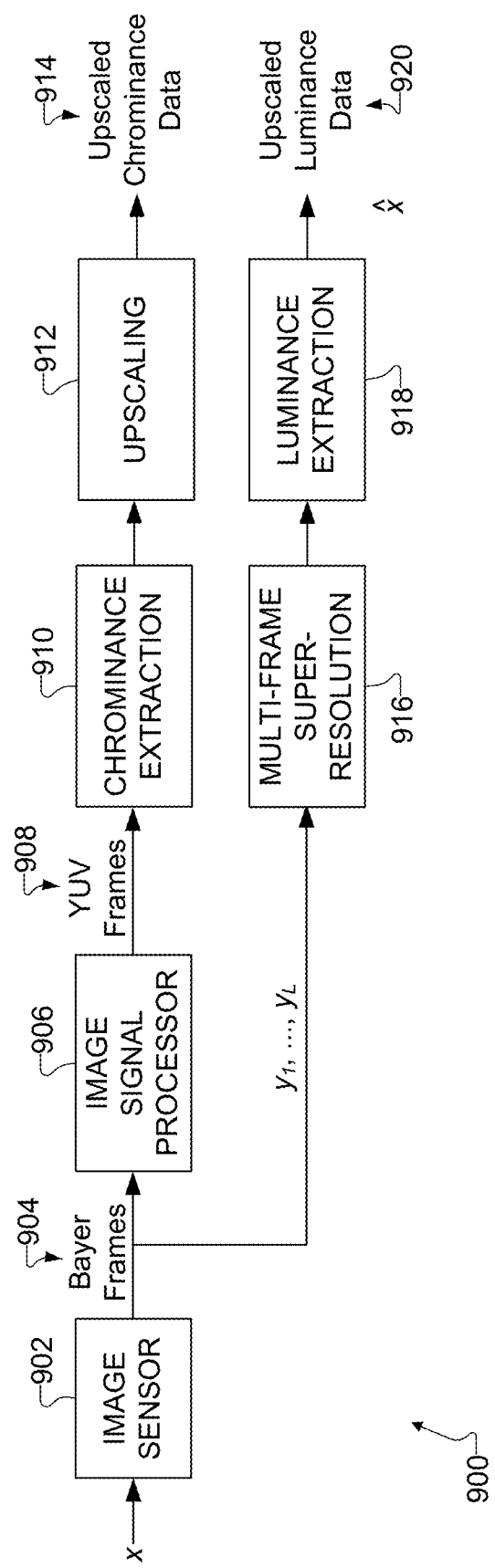
FIG. 9 illustrates a second example process for image capture and image rendering using multi-frame super-resolution in a mobile electronic device in accordance with this disclosure.

FIG. 9 illustrates a second example process 900 for image capture and image rendering using multi-frame super-resolution in a mobile electronic device in accordance with this disclosure. For ease of explanation, the process 900 shown in FIG. 9 is described as being performed using the electronic device 101 of FIG. 1. However, the process 900 shown in FIG. 9 could be used with any other suitable electronic device and in any suitable system.

As shown in FIG. 9, the process 900 involves the use of at least one image sensor 902, which again could represent one or more sensors 180 in at least one camera of the electronic device 101. The image sensor 902 can be used to generate raw image frames 904 associated with a scene. In this example, the image sensor 902 produces raw image frames 904 in the form of Bayer images. However, other image sensors 902 could produce raw image frames 904 in other forms. Any suitable image sensor(s) 902 could be used here, such as at least one stacked image sensor like the three-stack ISOCELL Fast 2L3 image sensor. An image signal processor 906 processes the raw image frames 904 to produce processed image frames 908. For example, the image signal processor 906 could perform image processing operations such as demosaicing, noise reduction, auto-exposure adjustment, auto-focus adjustment, and auto-white balance adjustment. In this example, the image signal processor 906 produces processed image frames 908 in the form of YUV frames that contain luminance and chrominance data. However, other image signal processors 906 could produce processed image frames 908 in other forms.

In this example, a chrominance extraction operation 910 receives and processes the image frames 908 to obtain the chrominance data from the processed image frames 908. This could include, for example, the chrominance extraction operation 910 retrieving the U and V chrominance data from the YUV image frames. An upscaling operation 912 receives the chrominance data and upscales the chrominance data to produce upscaled chrominance data 914. Any suitable amount of upscaling can be used, such as by upscaling the chrominance data by a factor of two. Any suitable upscaling technique can be used here, such as bilinear upscaling.

Also, in this example, the (color) raw image frames 904 are provided as the input image frames $y_l$-$y_L$ to a multi-frame super-resolution operation 916, which implements the optimization framework including the initialization operation 502, inversion operation 504, and regularization operation 506 in FIG. 5. The output of the multi-frame super-resolution operation 916 is provided to a luminance extraction operation 918, which obtains luminance data from the super-resolution output to produce upscaled luminance data 920. This could include, for example, the luminance extraction operation 918 retrieving the Y luminance data from the super-resolution output of the multi-frame super-resolution operation 916. The combination of the upscaled chrominance data 914 and the upscaled luminance data 920 represents a higher-resolution recreation of the scene (the final estimate $\hat{x}$), which has a higher resolution than the processed image frames 908.

Figure 10:
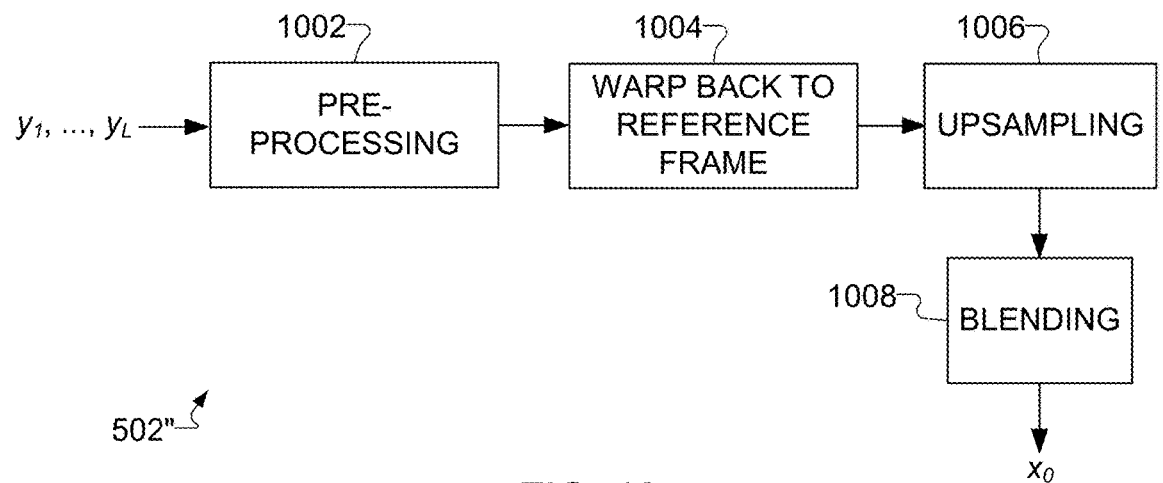
FIG. 10 illustrates an example initialization operation in the process of FIG. 9 in accordance with this disclosure.

FIG. 10 illustrates an example initialization operation 502" in the process 900 of FIG. 9 in accordance with this disclosure. In particular, the initialization operation 502" occurs as part of the multi-frame super-resolution operation 916. As shown in FIG. 10, the initialization operation 502" includes a pre-processing operation 1002, which generally operates to pre-process the raw image frames $y_l$-$y_L$ in some manner to provide part of the image processing that would otherwise be performed by the image signal processor 906. For instance, the pre-processing operation 1002 could perform a white balancing function to change or correct the color balance in the raw image frames $y_1$-$y_L$. The pre-processing operation 1002 could also perform a demosaicing function to reconstruct full color image frames from incomplete color samples contained in the raw image frames $y_l$-$y_L$ using a mask (such as a CFA mask). A warping function 1004 generally operates to align the raw image frames $y_l$-$y_L$ after the pre-processing. This is typically done by selecting one of the input image frames $y_l$-$y_L$ as a reference image frame and then aligning the other non-reference image frames to the reference image frame. The warping function 1004 can use any suitable technique to align image frames, and various alignment techniques are known in the art. An upsampling operation 1006 receives the aligned image frames and upsamples the image data to produce upsampled image frames. Any suitable amount of upsampling can be used, such as by upsampling the image data by a factor of two. Also, any suitable upsampling technique can be used here, such as bicubic upsampling. A blending operation 1008 receives the upsampled image frames and blends the image frames to produce the initial estimate $x_0$ of the scene. Any suitable blending technique can be used here, such as by averaging the pixel values in the upsampled aligned image frames. Note, however, that other techniques could be used to produce the initial estimate $x_0$ of the scene based on the image frames $y_l$-$y_L$.

Figure 11:
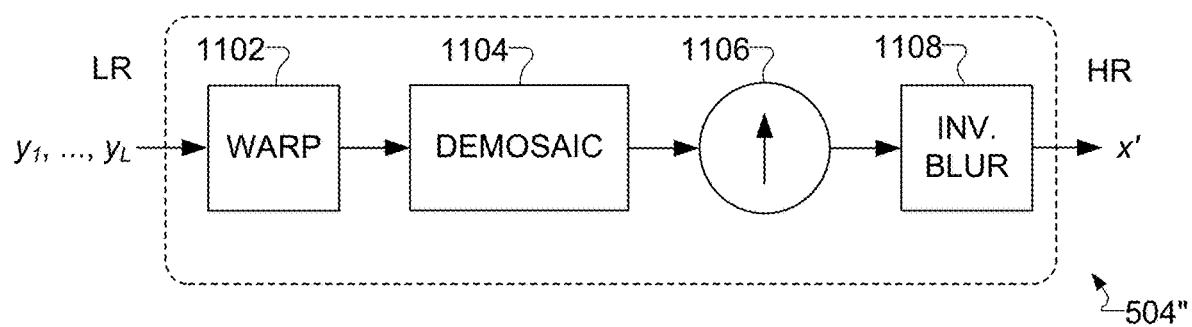
FIG. 11 illustrates an example inversion operation in the process of FIG. 9 in accordance with this disclosure.

FIG. 11 illustrates an example inversion operation 504" in the process 900 of FIG. 9 in accordance with this disclosure. In particular, the inversion operation 504" occurs as part of the multi-frame super-resolution operation 916. In general, the inversion operation 504" shown in FIG. 11 implements an inversion of the forward degradation models $202_a$-$202_L$ shown in FIG. 4 for color image data. To implement the inversion of the forward degradation models $202_a$-$202_L$, the inversion operation 504" includes warping operations 1102, demosaic operations 1104, upscaling operations 1106, and an inverse blurring operation 1108. The warping operations 1102 generally operate to reverse the motion affecting the scene, such as motion with the scene or motion or rotation of the electronic device 101. The demosaic operations 1104 generally operate to reverse the masking operations done using the CFA mask or other mask. The upscaling operations 1106 and the inverse blurring operation 1108 generally operate to reverse the loss of resolution by the electronic device 101, such as by reversing the loss of resolution due to the optics, image sensor 902, or other components of the electronic device 101.

In this implementation, the operations 1102, 1104, 1106, and 1108 represent a direct inversion model that converts the input image frames $y_l$-$y_L$ into a higher-resolution image x' of the scene x. In some embodiments, the direct inversion model can be implemented as a single FIR filter that approximates the true inverse of the forward degradation models $202_a$-$202_L$. As described above, a projected conjugate gradient technique, a conjugate gradient steepest descent technique, or other gradient descent technique can be used in the inversion operation 504" to generate the FIR filter iteratively. In these types of gradient descent techniques, each iteration of the inversion operation 504" generally attempts to identify a local minimum. For instance, in the conjugate gradient steepest descent technique, the steepest descent from the starting point of the iteration (as defined by either the initial estimate $x_0$ or the estimated scene x' from the prior iteration) converges to a new local minimum. One function of the multi-frame super-resolution operation 916 is to find the best approximate FIR filter representing the inversion model, where the approximate FIR filter is improved in each iteration of the process 500. Once the new local minimum is found, the process proceeds to the regularization operation 506 to de-noise the estimated image x' and, if needed, to feed back the new estimate to the inversion operation 504" for another iteration.

This inversion operation 504" can be performed for the image frames $y_l$-$y_L$ during each iteration of the process 500 in the multi-frame super-resolution operation 916. Ideally, this allows the process 500 to be used to recover an increased amount of image data from the original image frames $y_l$-$y_L$. The resulting improved image frames eventually converge during the iterations of the process 500 to be similar enough to be generally considered equivalent. For example, the differences between the estimates in successive iterations can eventually drop below some threshold value. Again, the exact amount of similarity between the resulting improved image frames can be based on any suitable criteria, such as a threshold percentage or amount. Also, the amount of similarity can vary based on the computational power available, which can limit the number of iterations or the time for performing the iterations.

Although FIG. 9 illustrates a second example of a process 900 for image capture and image rendering using multi-frame super-resolution in a mobile electronic device and FIGS. 10 and 11 illustrate examples of operations in the process 900 of FIG. 9, various changes may be made to FIGS. 9, 10, and 11. For example, various operations shown in FIGS. 9, 10, and 11 could overlap, occur in parallel, occur in a different order, or occur any number of times. Also, the specific operations shown in FIGS. 10 and 11 are examples only, and other techniques could be used to perform each of the operations shown in FIGS. 10 and 11.

It should be noted that the operations shown in FIGS. 2 through 11 can be implemented in an electronic device 101 in any suitable manner. For example, in some embodiments, the operations shown in FIGS. 2 through 11 can be implemented or supported using one or more software applications or other software instructions that are executed by the processor 120 of the electronic device 101. In other embodiments, at least some of the operations shown in FIGS. 2 through 11 can be implemented or supported using dedicated hardware components. In general, the operations shown in FIGS. 2 through 11 can be performed using any suitable hardware or any suitable combination of hardware and software/firmware instructions.

It should also be noted that the operations shown in FIGS. 2 through 11 are described above as being performed using a specific implementation of the electronic device 101, but a number of modifications can be made based on the actual electronic device 101 being used. For example, the electronic device 101 could include or use a single camera or multiple cameras. If a single camera is used, multiple image frames of a scene could be captured sequentially, such as in one or more fast bursts. If multiple cameras are used, it may be possible to capture multiple image frames concurrently or in an overlapping manner. If needed, multiple image frames of the scene could still be captured sequentially using at least one of the multiple cameras. Assuming the geometry of the multiple cameras is known ahead of time, this geometry can be used to help align the image frames captured by the cameras or perform other functions. As another example, the electronic device 101 is described above as performing various operations using Bayer or YUV image frames. However, data in other domains (such as RGB data) could also be used or processed. As a third example, the techniques described in this patent document could be combined with conventional high dynamic range (HDR) image processing algorithms, such as in a software library used by the electronic device 101. This may allow a user of the electronic device 101 to select between different image processing algorithms or other algorithms, such as based on the specific situation or based on user preference.

Figure 12:
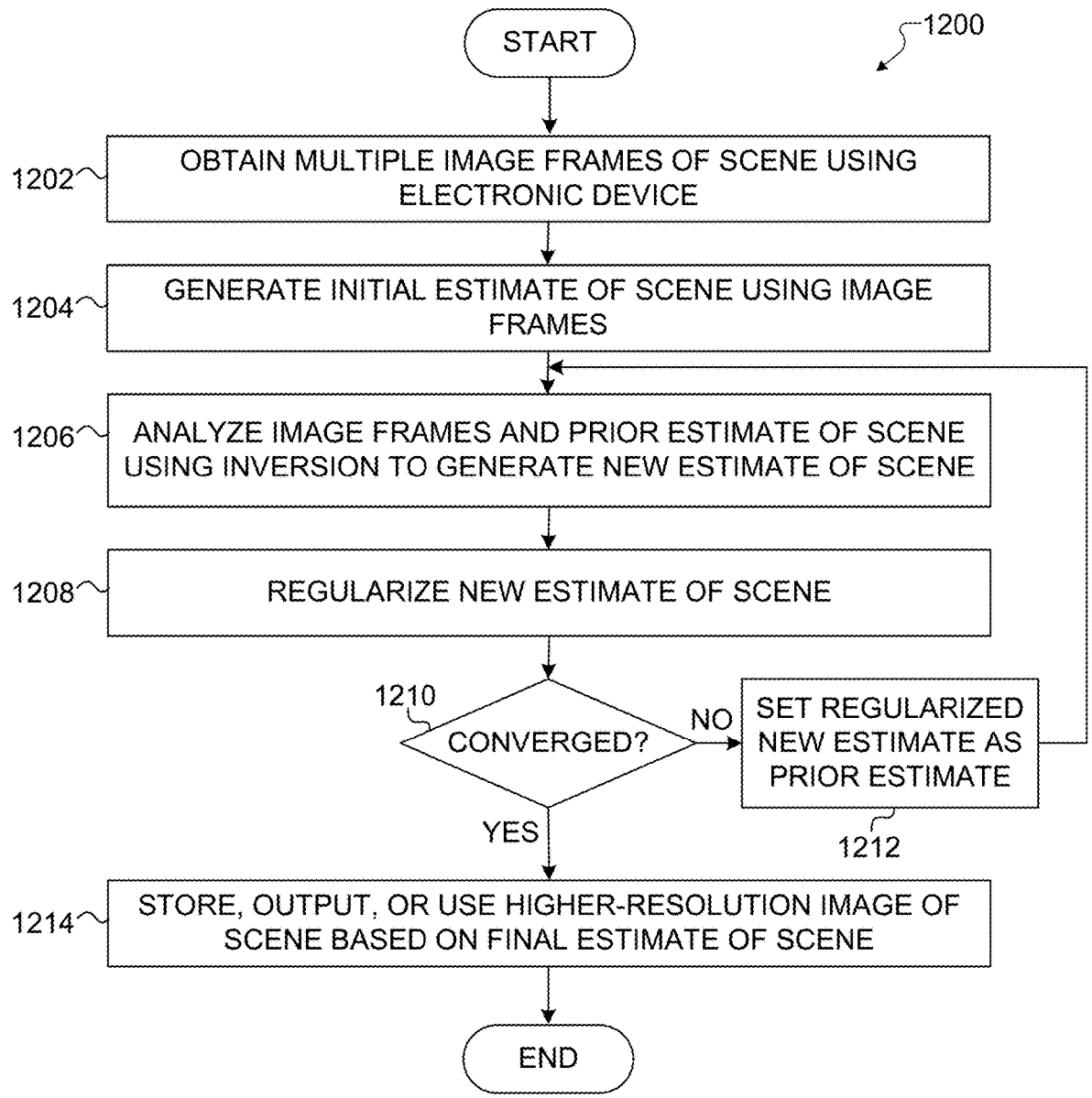
FIG. 12 illustrates an example method for image capture and image rendering using multi-frame super-resolution in a mobile electronic device in accordance with this disclosure.

FIG. 12 illustrates an example method 1200 for image capture and image rendering using multi-frame super-resolution in a mobile electronic device in accordance with this disclosure. For ease of explanation, the method 1200 shown in FIG. 12 is described as being performed using the electronic device 101 of FIG. 1 and the techniques shown in FIGS. 2 through 11. However, the method 1200 shown in FIG. 12 could be used with any other suitable electronic device and in any suitable system, and various steps in the method 1200 may or may not occur using the operations and functions shown in FIGS. 2 through 11.

As shown in FIG. 12, multiple image frames of a scene are obtained using an electronic device at step 1202. This could include, for example, the processor 120 of the electronic device 101 causing one or more image sensors 602 or 902 of at least one camera of the electronic device 101 to capture multiple Bayer or other raw image frames of a scene x. This could optionally also include the image signal processor 606 or 906 processing the image frames to produce YUV or other processed image frames. The processing by the image signal processor 606 or 906 can occur regardless of whether raw or processed image frames are used as the image frames $y_l$-$y_L$ to generate a final image of the scene x. For instance, the processing by the image signal processor 606 or 906 can be done to allow chrominance data to be extracted from the processed image frames.

An initial estimate of the scene is produced using the obtained image frames at step 1204. This could include, for example, the processor 120 of the electronic device 101 performing the initialization operation 502 as part of the multi-frame super-resolution operation 618 or 916 in order to generate the initial estimate $x_0$ of the scene x. If the image frames being processed are grayscale images (such as luminance values only), this could include aligning the image frames $y_l$-$y_L$ (such as by warping), upsampling the aligned image frames (such as by using bicubic upsampling), and blending the upsampled aligned image frames (such as by averaging the pixel values in the frames). If the image frames being processed are color images, this could include aligning the image frames $y_l$-$y_L$. (such as by warping), pre-processing the aligned image frames (such as by performing a white balancing function and a demosaicing function), upsampling the aligned image frames (such as by using bicubic upsampling), and blending the upsampled aligned image frames (such as by averaging the pixel values in the frames).

The obtained image frames and a prior estimate of the scene are used to generate a new estimate of the scene at step 1206. This could include, for example, the processor 120 of the electronic device 101 performing the inversion operation 504 as part of the multi-frame super-resolution operation 618 or 916 in order to generate the new estimate x' of the scene x. If the image frames being processed are grayscale images, this could include transforming each image frame $y_l$-$y_L$r into the frequency domain (such as by using an FFT), dividing the frequency domain data by the frequency response of a FIR filter, and transforming the division result back into the spatial domain (such as by using an IFFT). Alternatively, this could also include approximating an IIR filter using an FIR filter and applying the filter for inversion. If the image frames being processed are color images, this could include performing a projected conjugate gradient technique, a conjugate gradient steepest descent technique, or other technique.

The new estimate of the scene is regularized at step 1208. This could include, for example, the processor 120 of the electronic device 101 performing the regularization operation 506 as part of the multi-frame super-resolution operation 618 or 916 in order to regularize the new estimate of the scene. As noted above, this could include performing a Gaussian de-noising of the new estimate of the scene. A determination is made whether the process has converged on a final image of the scene at step 1210. This could include, for example, the processor 120 of the electronic device 101 determining whether the differences between estimates in successive iterations are below a suitable threshold. This could also include determining whether a specified number of iterations have occurred or whether a specified amount of time has elapsed. If not, the process sets the regularized new estimate of the scene as the prior estimate at step 1212, and the process returns to step 1206 to repeat the inversion and regularization operations.

Otherwise, the final higher-resolution image of the scene is stored, output, or used in some manner at step 1214. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 12 illustrates one example of a method 1200 for image capture and image rendering using multi-frame super-resolution in a mobile electronic device, various changes may be made to FIG. 12. For example, while shown as a series of steps, various steps in FIG. 12 could overlap, occur in parallel, occur in a different order, or occur any number of times.

Figure 13:
FIGS. 13 and 14 illustrate example results that can be obtained through image capture and image rendering using multi-frame super-resolution in accordance with this disclosure.
Figure 14:

FIGS. 13 and 14 illustrate example results that can be obtained through image capture and image rendering using multi-frame super-resolution in accordance with this disclosure. In FIG. 13, an image 1300 of a scene is captured using a standard imaging process. Here, the scene includes a number of different textures. These textures include grass, bricks, and stone in the lower portion of the image 1300 and a house having bricks, siding, and shingles in the upper portion of the image. However, as can be seen here, many of these textures appear somewhat blurry, which is a common problem when capturing images using standard digital zoom techniques.

In FIG. 14, an image 1400 of the same scene is captured using the approaches described above for image capture and image rendering using multi-frame super-resolution. As can be seen here, the grass, bricks, and stone in the lower portion of the image are clearer, and it is easier to discern surface features or other features. Similarly, the bricks, siding, and shingles of the house in the upper portion of the image are clearer, and it is easier to discern surface features or other features. From this, it can be seen that the approaches described above support detail enhancement in imaging systems, allowing improvements in digital zoom operations in order to more accurately mimic optical zoom operations.

Although FIGS. 13 and 14 illustrate examples of results that can be obtained through image capture and image rendering using multi-frame super-resolution, various changes may be made to FIGS. 13 and 14. For example, FIGS. 13 and 14 are merely meant to illustrate one example of the type of results that could be obtained using the approaches described in this disclosure. Obviously, images of scenes can vary widely, and the results obtained using the approaches described in this patent document can also vary widely depending on the circumstances.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining multiple image frames of a scene using at least one camera of an electronic device; and
    processing the multiple image frames of the scene to generate a higher-resolution image of the scene, wherein processing the multiple image frames of the scene comprises:
        generating an initial estimate of the scene based on the multiple image frames of the scene; and
        in each of multiple iterations, (i) generating a current estimate of the scene based on the multiple image frames of the scene and a prior estimate of the scene and (ii) regularizing the generated current estimate of the scene, the regularized current estimate of the scene from one iteration representing the prior estimate of the scene in a subsequent iteration;
    wherein the iterations continue until the estimates of the scene converge on the higher-resolution image of the scene; and
    wherein generating the initial estimate of the scene comprises warping at least some of the multiple image frames to align the image frames.

2. The method of claim 1, wherein:
    the multiple image frames of the scene comprise processed image frames generated by an image signal processor;
    generating the initial estimate of the scene comprises generating the initial estimate of the scene using the processed image frames; and
    generating the current estimate of the scene comprises generating the current estimate of the scene using the processed image frames.

3. The method of claim 2, wherein:
    warping at least some of the multiple image frames comprises warping at least some of the processed image frames; and
    generating the initial estimate of the scene comprises:
        upsampling the warped processed image frames; and
        blending the upsampled warped processed image frames.

4. The method of claim 2, wherein generating the current estimate of the scene comprises one of:
    performing an inversion of the processed image frames in a Fourier domain; and
    approximating an infinite impulse response (IIR) deconvolution filter using a finite impulse response (FIR) filter and applying the FIR filter to the inversion of the processed image frames.

5. The method of claim 1, wherein:
the multiple image frames of the scene comprise raw image frames generated by one or more image sensors;
generating the initial estimate of the scene comprises generating the initial estimate of the scene using the raw image frames; and
generating the current estimate of the scene comprises generating the current estimate of the scene using the raw image frames.

6. The method of claim 5, wherein generating the initial estimate of the scene comprises:
pre-processing at least some of the raw image frames, wherein warping at least some of the multiple image frames comprises warping at least some of the pre-processed raw image frames;
upsampling the warped pre-processed raw image frames; and
blending the upsampled warped pre-processed raw image frames.

7. The method of claim 5, wherein generating the current estimate of the scene comprises performing an inversion of the raw image frames using a projected conjugate gradient technique or a conjugate gradient steepest descent technique.

8. An electronic device comprising:
at least one camera; and
at least one processing device configured to obtain multiple image frames of a scene and process the multiple image frames of the scene to generate a higher-resolution image of the scene;
wherein, to process the multiple image frames of the scene, the at least one processing device is configured to:
generate an initial estimate of the scene based on the multiple image frames of the scene;
in each of multiple iterations, (i) generate a current estimate of the scene based on the multiple image frames of the scene and a prior estimate of the scene and (ii) regularize the generated current estimate of the scene, the regularized current estimate of the scene from one iteration representing the prior estimate of the scene in a subsequent iteration; and
continue the iterations until the estimates of the scene converge on the higher-resolution image of the scene; and
wherein, to generate the initial estimate of the scene, the at least one processing device is configured to warp at least some of the multiple image frames to align the image frames.

9. The electronic device of claim 8, wherein:
the multiple image frames of the scene comprise processed image frames generated by an image signal processor;
the at least one processing device is configured to generate the initial estimate of the scene using the processed image frames; and
the at least one processing device is configured to generate the current estimate of the scene using the processed image frames.

10. The electronic device of claim 9, wherein:
to warp at least some of the multiple image frames, the at least one processing device is configured to warp at least some of the processed image frames; and
to generate the initial estimate of the scene, the at least one processing device is configured to:
upsample the warped processed image frames; and
blend the upsampled warped processed image frames.

11. The electronic device of claim 9, wherein, to generate the current estimate of the scene, the at least one processing device is configured to one of:
perform an inversion of the processed image frames in a Fourier domain; and
approximate an infinite impulse response (IIR) deconvolution filter using a finite impulse response (FIR) filter and apply the FIR filter to the inversion of the processed image frames.

12. The electronic device of claim 8, wherein:
the multiple image frames of the scene comprise raw image frames generated by one or more image sensors;
the at least one processing device is configured to generate the initial estimate of the scene using the raw image frames; and
the at least one processing device is configured to generate the current estimate of the scene using the raw image frames.

13. The electronic device of claim 12, wherein, to generate the initial estimate of the scene, the at least one processing device is configured to:
pre-process at least some of the raw image frames, wherein, to warp at least some of the multiple image frames, the at least one processing device is configured to warp at least some of the pre-processed raw image frames;
upsample the warped pre-processed raw image frames; and
blend the upsampled warped pre-processed raw image frames.

14. The electronic device of claim 12, wherein, to generate the current estimate of the scene, the at least one processing device is configured to perform an inversion of the raw image frames using a projected conjugate gradient technique or a conjugate gradient steepest descent technique.

15. A non-transitory machine-readable medium containing instructions that when executed cause at least one processor of an electronic device to:
obtain multiple image frames of a scene using at least one camera of the electronic device; and
process the multiple image frames of the scene to generate a higher-resolution image of the scene;
wherein the instructions that when executed cause the at least one processor to process the multiple image frames of the scene comprise instructions that when executed cause the at least one processor to:
generate an initial estimate of the scene based on the multiple image frames of the scene;
in each of multiple iterations, (i) generate a current estimate of the scene based on the multiple image frames of the scene and a prior estimate of the scene and (ii) regularize the generated current estimate of the scene, the regularized current estimate of the scene from one iteration representing the prior estimate of the scene in a subsequent iteration; and
continue the iterations until the estimates of the scene converge on the higher-resolution image of the scene; and
wherein the instructions that when executed cause the at least one processor to generate the initial estimate of the scene comprise instructions that when executed cause the at least one processor to warp at least some of the multiple image frames to align the image frames.

16. The non-transitory machine-readable medium of claim 15, wherein:
the multiple image frames of the scene comprise processed image frames generated by an image signal processor;
the instructions that when executed cause the at least one processor to generate the initial estimate of the scene comprise instructions that when executed cause the at least one processor to generate the initial estimate of the scene using the processed image frames; and
the instructions that when executed cause the at least one processor to generate the current estimate of the scene comprise instructions that when executed cause the at least one processor to generate the current estimate of the scene using the processed image frames.

17. The non-transitory machine-readable medium of claim 16, wherein:
the instructions that when executed cause the at least one processor to warp at least some of the multiple image frames comprise instructions that when executed cause the at least one processor to warp at least some of the processed image frames; and
the instructions that when executed cause the at least one processor to generate the initial estimate of the scene comprise instructions that when executed cause the at least one processor to:
upsample the warped processed image frames; and
blend the upsampled warped processed image frames.

18. The non-transitory machine-readable medium of claim 16, wherein the instructions that when executed cause the at least one processor to generate the current estimate of the scene comprise instructions that when executed cause the at least one processor to one of:
perform an inversion of the processed image frames in a Fourier domain; and
approximate an infinite impulse response (IIR) deconvolution filter using a finite impulse response (FIR) filter and apply the FIR filter to the inversion of the processed image frames.

19. The non-transitory machine-readable medium of claim 15, wherein:
the multiple image frames of the scene comprise raw image frames generated by one or more image sensors;
the instructions that when executed cause the at least one processor to generate the initial estimate of the scene comprise instructions that when executed cause the at least one processor to generate the initial estimate of the scene using the raw image frames; and
the instructions that when executed cause the at least one processor to generate the current estimate of the scene comprise instructions that when executed cause the at least one processor to generate the current estimate of the scene using the raw image frames.

20. The non-transitory machine-readable medium of claim 19, wherein:
the instructions that when executed cause the at least one processor to generate the initial estimate of the scene comprise instructions that when executed cause the at least one processor to:
pre-process at least some of the raw image frames, wherein the instructions that when executed cause the at least one processor to warp at least some of the multiple image frames comprise instructions that when executed cause the at least one processor to warp at least some of the pre-processed raw image frames;
upsample the warped pre-processed raw image frames; and
blend the upsampled warped pre-processed raw image frames; and
the instructions that when executed cause the at least one processor to generate the current estimate of the scene comprise instructions that when executed cause the at least one processor to perform an inversion of the raw image frames using a projected conjugate gradient technique or a conjugate gradient steepest descent technique.

* * * * *